Figure 1:
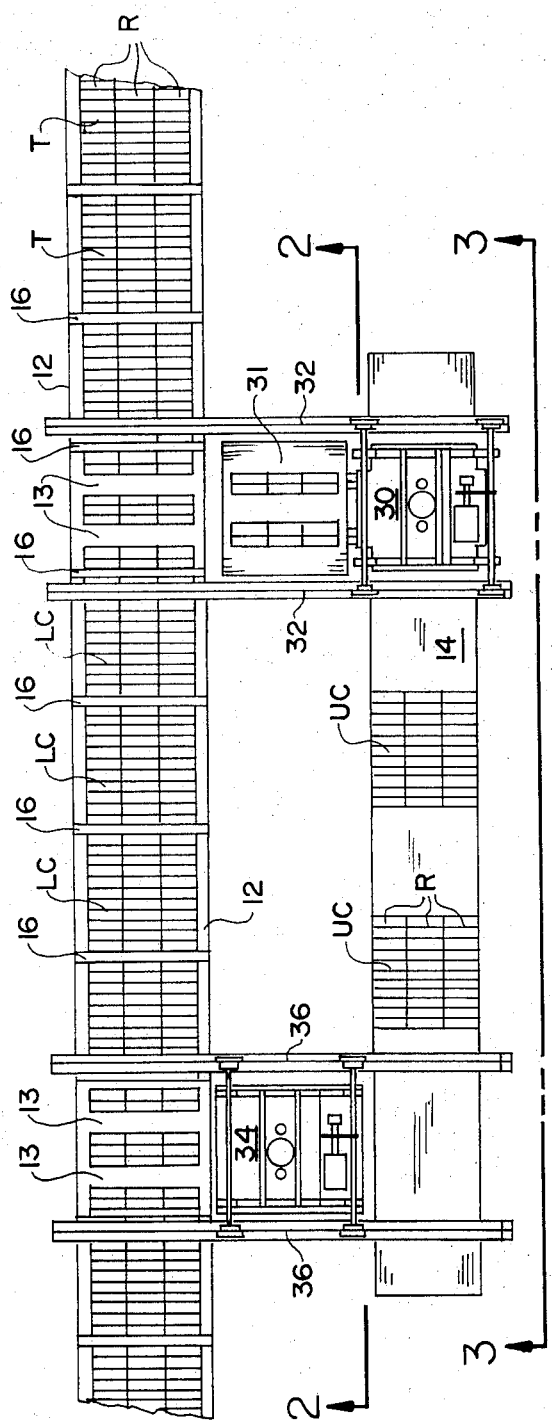

United States Patent [19]
Stuart

[11] 3,777,873
[45] Dec. 11, 1973

[54] BRICK CONVEYOR

[75] Inventor: Gerald L. Stuart, Siler City, N.C.

[73] Assignee: Forrest Paschal Machinery Company, Siler City, N.C.

[22] Filed: May 4, 1972

[21] Appl. No.: 250,151

[52] U.S. Cl. .................................. 198/35, 214/6 A
[51] Int. Cl. ...................... B65g 57/00, B65g 59/00
[58] Field of Search ................. 198/19, 35; 214/6 A

[56] References Cited
UNITED STATES PATENTS
3,039,593   6/1962   Edmonds ............................ 198/35

Primary Examiner—Edward A. Sroka
Attorney—Charles R. Rhodes

[57] ABSTRACT

Trays of brick, stacked two courses to a tray, one atop the other, are marshalled along a main index conveyor to a first transfer point, where a first transfer carriage removes the upper course from each tray, and transfers it to an auxiliary index conveyor synchronized with and driven in the same direction as the main conveyor. The bricks then proceed down parallel paths on the main and auxiliary conveyors in single layers facilitating grading and inspection, yet maintaining the economy realized from a multi-layered path. After inspection and grading a separator sheet is placed atop the lower course on the main conveyor, and, upon reaching a second transfer point, the upper course is returned to its original position atop one of the lower courses by means of a second transfer carriage. During the transfer, other operations may be performed, such as everting of the upper course and the forming of tyne courses in selected lower courses.

9 Claims, 3 Drawing Figures

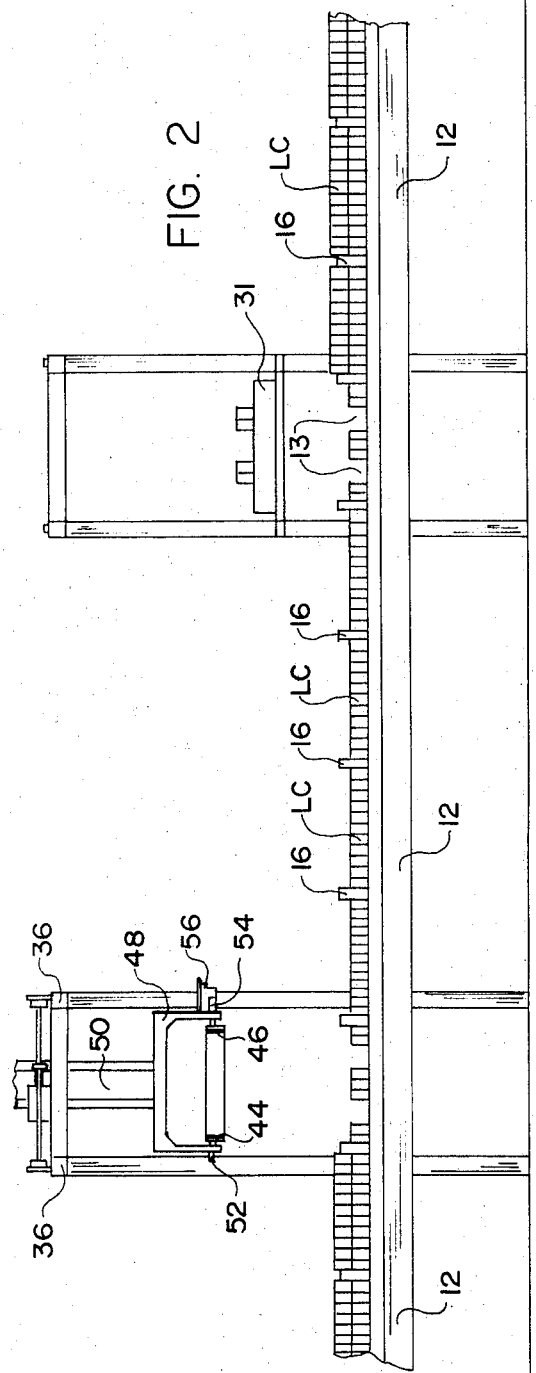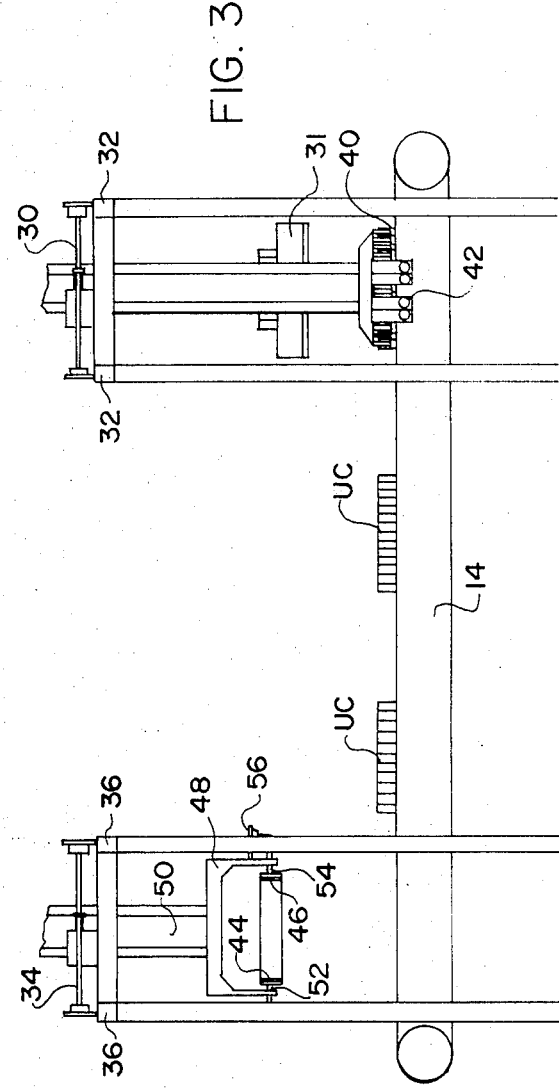

BRICK CONVEYOR

BACKGROUND OF THE INVENTION

In the process of their manufacture, bricks are customarily arranged for firing purposes in open stacks upon kiln cars which are conducted through a furnace or kiln. Each stack comprises a plurality of tiers, each tier having two courses therein with spaces between adjacent bricks in each course, hence the term "open" stacks. Following the firing operation, the bricks on the kiln cars must be unstacked, inspected, graded, grouped and conveyed to a stacking and strapping machine preparatory to shipment and eventual use. Automated methods and apparatus for unstacking kiln cars have been developed wherein the kiln cars are unstacked two courses or a tier at a time, the bricks grouped together tightly, and placed in trays on an off-bearing conveyor to an automated stacking and strapping machine. By unloading the kiln cars two courses at a time, the conveyor output is twice as would be the case if the courses were unloaded and conveyed one course at a time.

Conveying the courses two layers at a time, however, generates some problems in that sometime previous to the stacking of the courses into the final packages, each course must be inspected, graded, and separator sheets placed between the courses of each tier, especially in situations where the bricks are going to be shipped by rail car. Also, tyne openings for handling completed stacks by fork trucks must be formed in the lower course of every fifth tier. In some cases, the upper courses must be everted 180° or "defaced" so that the faces of the brick are always on the upper surface of each course in the finished stack.

SUMMARY OF THE INVENTION

The present invention, therefore, provides a method and apparatus for breaking apart the courses of each tier for a short period of time, and in this resppct tiers of bricks comprising two courses are marshalled along a main index conveyor to a first transfer point, where the upper course thereof is removed and deposited onto a parallel auxiliary index conveyor. The main index conveyor and the auxiliary index conveyor are operated synchronously, and in a direction parallel to each other, so that every time one upper course is removed from the main conveyor another upper course is returned. The bricks from the upper course proceed down the auxiliary conveyor while the bricks in the lower course are carried down the main conveyor whereupon operators may grade and inspect the bricks in each course and subsequently place a separator sheet atop the lower course. Upon reaching a second transfer point, the upper course is returned to its original position atop a lower course on the main conveyor by means of a second transfer carriage. It is not necessary, in fact it is desirable for blending purposes that the upper course be returned to a different lower course than that from which it was removed.

Although the specification is directed to brick handling, it is readily apparent that it is applicable to any type of article which is of a known size and shape, processed in double layers, wherein at some point operations must be performed on each layer individually.

It is therefore an object of the present invention to provide a method and apparatus for more economically conveying bricks unstacked from a kiln car to a brick stacking machine while permitting operations on each course individually at an intermediate point therebetween.

It is another object of the present invention to provide a method and apparatus of the type described wherein bricks are initially conveyed in two-course tiers and an auxiliary conveyor is positioned adjacent the main indexing conveyor for breaking the tiers down into single courses and providing a second separate path for the upper course so that each course may be inspected, graded or other operations performed on either course separately of the other.

Other objects of the present invention will become apparent upon reading the following detailed description of the invention, along with the appended drawings wherein:

FIG. 1 is a plan view, with the conveyor ends broken away, illustrating the apparatus according to the present invention; and FIG. 2 is a sectional view taken substantially along lines 2—2 in FIG. 1; and FIG. 3 is a sectional view taken substantially along lines 3—3 in FIG. 1.

In FIG. 1 bricks have been deposited on the initial end (not shown) of a main conveyor 12 from a kiln car having fired bricks conventionally arranged thereon in a plurality of stacks, each stack comprising a plurality of alternating header-oriented and stretcher-oriented double-course tiers. Each course includes a plurality of rows R, with eleven bricks in each row. The numbers of rows in a course, while illustrated here as three, can vary from one to six, six rows being about the maximum which can be lifted between gripper members.

In accordance with the present invention, successive double-course tiers T are removed one at a time from the kiln car and loaded in trays on a main indexing conveyor 12. The tiers T are successively indexed along conveyor 12 until they reach a first transfer point, whereupon the upper course UC is lifted by a first transfer carriage 30 and transferred over onto one end of an auxiliary indexing conveyor 14. At the same time, if desired, selected bricks from lower course LC are removed by transfer carriage 30 to provide tyne openings 13 in the lower course. The bricks removed from lower course LC are deposited on a tyne table 15, in the path of carriage 30 from main conveyor 12 to auxiliary conveyor 14.

The auxiliary index conveyor 14 is so operated and synchronized with main conveyor 12 that it moves in the same direction along a line parallel to the main index conveyor for a prescribed distance. As one upper course is removed from main conveyor 12, another upper course is returned while auxiliary conveyor 14 is indexing to the next position. Then as the upper course removed from conveyor 12 is transferred to and deposited on the auxiliary conveyor 14, the main conveyor is indexing to the next position. As the separated courses LC, UC are moved in parallel along the main index conveyor 12 and auxiliary index conveyor 14, the bricks in each course may be inspected and graded by operators preferably placed between the two conveyor lines. Also, a separator sheet may be placed atop the lower course LC after the inspection and grading is completed. Moreover, specialized transfer equipment may be utilized in transferring the upper course to or from auxiliary conveyor 14 whereby the upper course may be rotated 180° to deface the upper layer.

As the upper course UC and lower course LC of tiers T reach a second transfer point, a second transfer carriage 34 returns the upper course to its initial position atop the corresponding lower course, thereby reforming tier T, from whence the bricks proceed to a conventional stacking and strapping station. It should be noted that it is preferable, for blending purposes, to return the upper course UC to a different tier on the main conveyor 12 than that from which it was taken. This may easily be accomplished by providing less positions or indexes between the two transfer points on the auxiliary conveyor than are provided on the main conveyor. In such an arrangement, the upper course will reach the return transfer point on the main conveyor before the lower course from which it was lifted.

For performing the foregoing and related functions, the apparatus according to the present invention generally comprises a main indexing conveyor 12 of the endless-apron type and preferably having a plurality of separator walls 16 spaced therealong forming a plurality of trays therebetween. The distance between adjacent walls 16 or the length of each tray is equal to the length of each row R in each course, which is equivalent to eleven headers in the set up shown and illustrated in FIGS. 1 and 2. Such an arrangement is hereinafter referred to as a tray-type conveyor, with each tray containing a double course tier T of brick, and the walls 16 being sufficiently high to prevent sliding or toppling of the bricks as the conveyor is in motion. Where the conveyor is operated at sufficiently slow speeds, the walls 16 may be eliminated.

The auxiliary index conveyor 14 is also preferably of the endless apron type, however, since only one course of brick is moved therealong, the separator walls are considered to be unnecessary. The main index conveyor 12 and auxiliary index conveyor 14 are so synchronized that they both alternately move and stop at the same time, so that the loading and unloading operations are carried out on one conveyor while the other conveyor indexes.

Loaded kiln cars supporting stacks of fired bricks are moved to an unloading station adjacent one end of the main indexing conveyor 12 (not shown) and unloaded in any known fashion in which tiers of brick two courses high will be placed on the conveyor 12. One such unloading apparatus is illustrated and described in commonly-assigned application Ser. No. 126,615 filed Mar. 22, 1971.

The important thing about the unloading apparatus insofar as this application is concerned is that it removes double course tiers of brick from the kiln car and deposits each course of bricks in one of the trays of index conveyor 12.

At the first transfer position a first transfer carriage 30 is mounted on a pair of rails 32 for horizontal translatory motion back and forth between the main index conveyor 12 and one end of the auxiliary index conveyor 14. Transfer carriage 30 is preferably of the type illustrated and described in applicant's copending application Ser. No. 249,031, filed May 1, 1972, which discloses an apparatus for automatically forming the tyne course in double-course tiers as they proceed along an indexing conveyor comprising, in general, a pickup head having two independently operated sets of grippers 40, 42. One set of grippers 40 lifts and transfers the upper course to a second position, while the second set 42 grips and lifts selected bricks from the lower course to form the tyne openings therein. The selected bricks are deposited on an intermediate or auxiliary tyne brick table 31. By using such an apparatus in combination with the present method, the step of forming the tyne layer may be combined with movement of the upper course onto the auxiliary conveyor during the grading and inspecting step, realizing even further economies. The type course is only formed once every five tiers, therefore, since the two sets of grippers are operated independently, as the other four tiers are transferred only the first set of grippers of head 30 are activated. The transfer carriage 30 may also be of the type that lowers, grips on the headers of the upper course, lifts back up, transfers and sets the course down; or it may be of the type that lowers and applies suction to the upper surface of each brick in the upper course of tier T, lifts, traverses and sets the course down; or it may be of other similar types if it is not necessary or desired to form the tyne course during this step.

The return transfer carriage 34 may be one of the several well known types of transfer carriages described in the preceding paragraph which reciprocates back and forth on a set of rails 36 similar to rails 30 and merely drops down, lifts the upper course UC from auxiliary conveyor 14 and returns it to its place atop the one of the lower courses on main index conveyor 12. However, preferably, transfer carriage 34 is of a type illustrated in FIGS. 2 and 3 including a pair of grippers 44, 46 which are pivotally attached to a frame 48 positioned adjacent the ends of rows R and movable from a release position out of engagement with the bricks to a gripping position in engagement with the ends of the rows of brick. Frame 48 is movable both vertically by means of a hydraulic cylinder 50 and transversely between conveyors 12, 14 on rails 36. Grippers 44, 46 are mounted on the inner ends of shafts 52, 54, which in turn are journalled in the side walls of frame 48, thus providing a pivotal mounting means for grippers 44, 46. A commercially available everter 56 is attached to the outer end of one of the shafts 54, whereby as each upper course UC is lifted and transferred from auxiliary conveyor 14 back to main conveyor 12, the entire course is rotated 180°, so that the bricks therein are defaced, and the finished stack will include all courses having the faces of the bricks therein facing in the same direction.

In FIG. 3, it should be noted that upper courses UC are spaced along the surface of the conveyor 14. From such spacing it is apparent that conveyor 14 is being operated faster than conveyor 12, and that a selected upper course UC will be returned to main conveyor 12 atop a different lower course LC from which it was removed. This is the preferable method as it will aid in the blending of the brick in the final stacking, however it is within the scope of the invention to operate both conveyors at the same speed where blending is not desired or is to be accomplished elsewhere.

During the time the upper course UC is on auxiliary conveyor 14, an operator positioned between the two layers can grade and inspect both courses and place a separator sheet atop the lower course previous to the return of the upper course, or perform other manual operations such as forming tyne courses. Heretofore, it has been almost impossible to process bricks in double courses because of the necessity in certain types of shipping operations to have a separator sheet between each course and because of the difficulty in grading and inspecting the lower course when it is covered with bricks. The present method permits such processing, which obviously is more economical since the bricks are unstacked and conveyed in two layers at a time.

Although a preferred embodiment of the invention has been shown and illustrated, it should be understood that various modifications might be developed without departing from the scope of the invention, which should be limited only by the following claims.

What is claimed is:

1. Method of grading and inspecting articles proceeding along a main indexing conveyor in double-course tiers comprising the steps of:
   a. successively receiving said double-course tiers of incoming articles at a first transfer point;
   b. removing and transferring the upper course to an auxiliary indexing conveyor synchronized with and parallel to the main indexing conveyor;
   c. conveying the upper course and lower course separately for a period of time while each course is graded and inspected; and
   d. returning said upper course from said auxiliary conveyor to its initial position atop a lower course on the main conveyor at a second transfer point.

2. The method according to claim 1 wherein said upper layer is replaced onto a different tier in step (d) than that from which it was taken.

3. The method according to claim 1 wherein a separator sheet is placed atop each of the lower courses on the main conveyor prior to step (d).

4. The method according to claim 1 wherein selected articles from the lower course are lifted and removed simultaneously with the lifting of the upper course from selected tiers on the main conveyor, the selected articles from the lower course being deposited on an auxiliary table prior to the placing of the upper course on the auxiliary conveyor.

5. The method according to claim 1 wherein during step (d), the upper course is everted 180°, thereby depositing the articles thereof face up on the lower course preparatory to the stacking operation.

6. Apparatus for grading and inspecting articles proceeding along a main index conveyor in double course tiers comprising:
   a. an auxiliary index conveyor extending along a portion of the length of the main conveyor, said auxiliary conveyor being synchronized with and moving parallel with said main conveyor;
   b. a first transfer carriage including a first gripping means for lifting the upper course from each tier on the main index conveyor at a first transfer position and transferring said upper course to one end of the auxiliary conveyor;
   c. a second transfer carriage including means for lifting each upper course from said auxiliary conveyor at a second transfer position and transferring said upper course back onto one of the lower courses on said main conveyor.

7. The apparatus according to claim 6 wherein said first transfer carriage further includes a second gripping means for gripping and lifting selected articles from the lower course along with the upper course to form a tyne course in selected tiers.

8. The apparatus according to claim 7 wherein said first and second gripping means are activated independently of each other so that articles from the lower courses are transferred only in selected tiers.

9. The apparatus according to claim 6 wherein said second transfer carriage includes an everting means for rotating upper courses 180° as they are transferred back to the main conveyor.

* * * * *